Dec. 28, 1954  J. K. GAYLORD ET AL  2,698,364
ROTARY SPEED RESPONSIVE SWITCH
Filed Nov. 26, 1952

Inventors:
James K. Gaylord
Lewis E. Thatcher
By Gary, Dismond & Parker
Attys.

United States Patent Office 2,698,364
Patented Dec. 28, 1954

2,698,364

ROTARY SPEED RESPONSIVE SWITCH

James K. Gaylord and Lewis E. Thatcher, Chicago, Ill., assignors to Gaylord Products, Incorporated, Chicago, Ill., a corporation of Delaware Application November 26, 1952, Serial No. 322,705

4 Claims. (Cl. 200—80)

This invention relates to improvements in a speed detection device and refers particularly to a device for opening or closing an electric signal or control circuit in response to a predetermined speed of rotation of a rotary body.

Devices have heretofore been proposed for making or breaking an electric circuit in response to the speed of rotation of a rotating shaft or body. Such devices heretofore devised have been found to be complicated in their construction and have also been found to be unreliable in operation and also incapable of sharp discrimination or detection of predetermined speeds.

The present invention contemplates an electric switch which employs an entirely new concept in detecting or discriminating speeds, the detection or discrimination resulting in the production of a signal, audible, visible or otherwise, or in the control of a predetermined operation.

Briefly described, my invention employs the thrust produced by a rotating surface, disposed angularly with respect to its plane of rotation, upon a body of liquid, the thrust taking place at right-angles to the plane of rotation to separate two components or electrodes of an electric circuit.

The objects and advantages of my invention will be apparent from the accompanying drawing and following detailed description.

Figure 1:
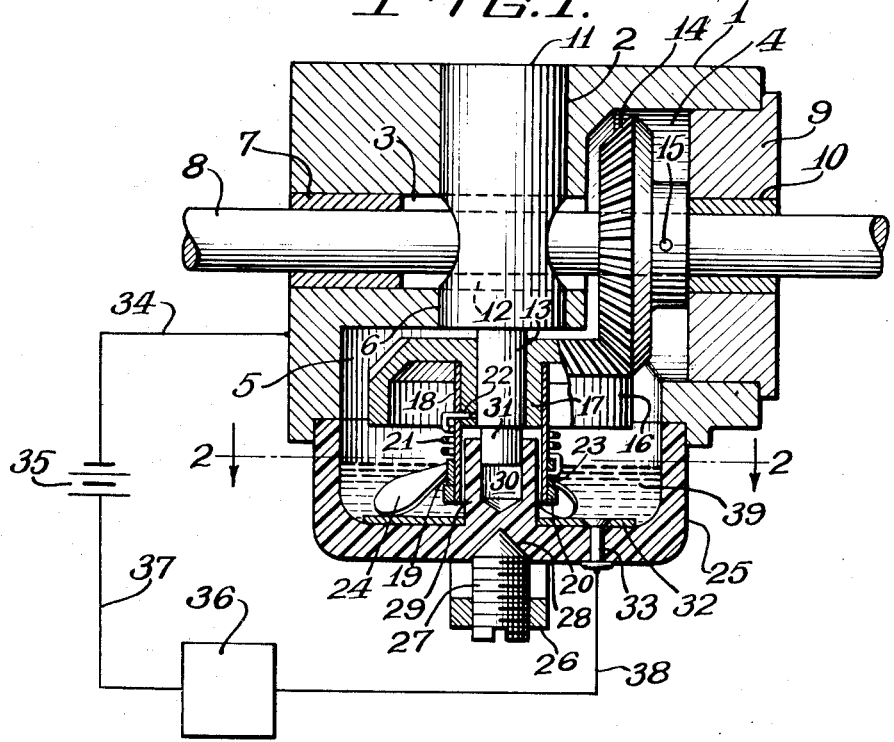

In the drawing, Fig. 1 is a sectional view of the device comprising the present invention.

Figure 2:
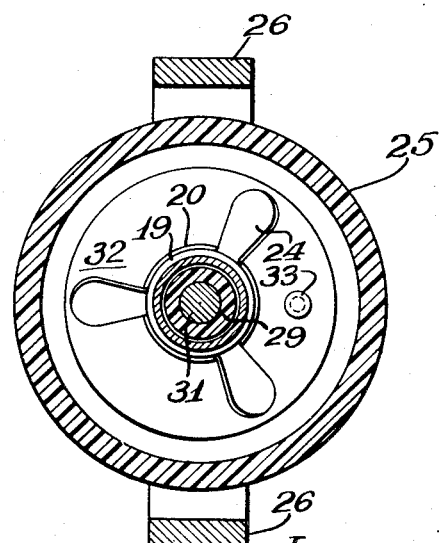

Fig. 2 is a horizontal sectional view taken on line 2—2 of Fig. 1.

Referring in detail to the drawing, the device comprising the invention may include a housing 1 which may be cored or bored to provide a central cylindrical recess 2, a transverse recess 3, a lateral recess 4 and a bottom recess 5. The transverse recess 3, at one end may open into the lateral recess 4 and at the opposite end may open to one lateral side of the housing 1. The recess 2 and recess 3 may intersect in the body of the housing 1 and a continuation 6 of the recess 2 may open into the bottom recess 5.

A bearing 7 is positioned at the end of recess 3 and functions as a bearing for a shaft 8 which may be positioned in the recess 3. A closure member 9 may be positioned over the mouth of the lateral recess 4 and may carry a bearing ring 10 adapted for the support of shaft 8.

The present invention is adapted to function as a detector of rotary speed, being adapted to complete or break an electric circuit to produce an audible or visual signal or to start or stop a predetermined operation. The rate of rotation of shaft 8 may be proportional to the rate of rotation of some related machine or body or may be proportional to the translatory or rectilinear speed of a machine or body wherein a predetermined function, operation or signal is to be produced when the rotating body or the rectilinearly moving body reaches a predetermined velocity. Of course, the means for rotating the shaft 8 is not shown but it is understood that the shaft will be operatively connected to any device whose operation is to be controlled or about which a given speed of rotation or travel is to be noted.

A cylindrical member 11 is fixedly positioned in the recesses 2 and 6, said cylindrical member being provided with a transverse bore 12 for the reception of shaft 8. At the lower end of the cylindrical member 11, a restricted portion 13 extends downwardly into recess 5. A bevel gear 14 is mounted upon shaft 8 and is rigidly secured thereto by means of set screw 15. The bevel gear 14 meshes with a companion gear 16 which is provided with a hub portion 17 which rotates freely upon the restricted shaft 13. The arrangement is such that rotation of shaft 8 results in rotation of the companion bevel gear 16.

A sleeve 18 is rigidly positioned upon the external portion of hub 17 and extends downwardly from said hub. A ring 19 is freely rotatable upon the exterior surface of the lower portion of the sleeve 18. A stationary ring 20 is mounted upon the lower portion of the sleeve 18 and functions to limit the downward movement of the ring 18. A coil spring 21 embraces that portion of the sleeve 18 which extends below the hub 17, one end of the coil spring being anchored in the hub 17 as shown best at 22 in Fig. 1. The opposite end of coil spring 21 is anchored in the rotatable ring 19 as shown best at 23 in Fig. 1. A plurality of blades 24 are carried upon the outer surface of the rotatable ring 19, said blades being angularly disposed with respect to the plane of rotation of the ring 19 and being positioned generally radially with respect to said ring. It will be seen that the ring 19 and the blades 24 are carried by spring 21 and when the companion bevel gear 16 rotates, the ring 19 and blades 24 will also be rotated, the connection between the ring 19 and blades 24 with respect to the hub 17 being a resilient connection.

A cup 25, constructed of an insulating material such as hard rubber, a resinous plastic or the like forms a closure for the lower portion of the bottom recess 5. U-shaped strap 26 has its ends pivotally secured to opposite side walls of the housing 1 and the curved portion of the U-shaped strap carries a set screw 27. A conical aperture 28 is provided in the bottom central portion of the cup 25 for the reception of the pointed portion of set screw 27. When set screw 27 is positioned snugly into the conical aperture 28 the cup 25 will be securely mounted upon the lower portion of the housing.

A boss 29 extends upwardly from the interior of the central portion of the cup 25 and is provided with a central recess 30 into which a restricted portion 31 of the shaft 13 extends. In this fashion the lower end of the shaft 13 is supported. An annular plate 32 of electrically conducting material is positioned in the bottom of cup 25 and is connected to a jumper 33 which extends through the bottom wall of the cup.

In employing the present device one conductor 34 of a circuit may be connected to the body of the housing 1, the conductor 34 being connected to a source of electric current 35, the opposite end of which may be connected to a signal device, a control device or the like 36 by means of conductor 37. The opposite side of the electrical mechanism 36 is connected by means of conductor 38 to the jumper 33 which in turn is electrically connected to plate 32.

In operation, when the shaft 8 is rotated, bevel gear 14 rotates the companion gear 16 which in turn, through the agency of coil spring 21 rotates the movable ring 19 and the blades 24. When the ring 19 and blades 24 are stationary, the end portions of the blades 24 rest upon and make electrical contact with the plate 32 and hence the electrical circuit to the device 36 is completed. As a feature of the present invention, a pool of non-conducting liquid 39 may be positioned in cup 25. The liquid 39 may be of any desired viscosity and preferably comprises an oil of relatively good insulating properties.

As has been hereinbefore described when the blades 24 are stationary they make electrical contact with the plate 32. However, when the blades 24 rotate, a thrust is exerted upon said blades by the liquid 39, said thrust acting to move the blades upwardly, the movement being accommodated by the loosely positioned ring 19 upon sleeve 18 and being partially resisted by the coil spring 21. By the proper tensioning or loading of coil spring 21 the upward thrust of the blades 24 and ring 19 may be so contrived as to take place when the gear 16 rotates at a predetermined speed. Of course, when the blades 24 and ring 19 move upwardly along sleeve 18, electrical contact between the blades 24 and the ring 32 is broken and hence the electrical circuit comprising the device 36 will be broken. Hence, the present device contemplates a mechanism for breaking the circuit to the device 36 at a predetermined rotational speed of the gear 16. Of course, gear 16 is dependent for its rotation upon gear 14 and shaft 8 and hence the breaking of the electrical circuit as hereinbefore described, will take place when shaft 8 rotates at a predetermined rate.

Of course, it is to be understood that the constants of the present device may be changed so as to cause separation of the blades 24 from the ring or plate 32 at a predetermined speed of rotation of shaft 8. The primary adjustments may be the speed ratio between the device operated on and the shaft 8 and the ratio of the gears 14 and 16. These relationships constitute what may be termed the coarse adjustments. Finer and more critical adjustments may comprise the relative viscosity of the liquid 39, the pitch of the blades 24, the strength of spring 21 and the direction of the helix comprising the spring relative to the direction of rotation of the gear 16, that is, whether rotation of the gear 16 in a predetermined direction tends to wind or unwind the spring 21. To secure good electrical contact between the blades 24 and ring or plate 32, it is preferable that both the blades 24 and the ring or plate 32 be coated with mercury, or if desired, a shallow pool of mercury may cover the ring or plate 32 in which the blades may dip when the circuit to the device 36 is closed.

Of course, the device 36 may constitute a signal device or control device which may be rendered inoperative when the circuit thereto opens, or said device may constitute a normally closed relay switch which may be closed when the circuit to its coil is opened, wherein, for instance, a signal may be given positively or an operation controlled, positively, when the device reaches its critical speed.

The device comprising the present invention may be employed for many purposes, and, in general, may be used wherever centrifugal governors or speed detectors have heretofore been employed. It is preferable that the blades 24 rotate about a vertical axis, but for many uses the axis of rotation may be canted somewhat from the vertical and still the device will function efficiently.

We claim as our invention:

1. An electric switch responsive to the rotary speed of a rotating body which comprises, a container, an electrically conductive member carried in the container, a pool of electrically non-conductive liquid carried in the container in contact with and above the conductive member, a rotatable driving member disposed transversely to said electrically conductive member, an electrically conductive deflecting element axially and rotatably movable upon said driving member, resilient means connecting said deflecting element and said driving member, said deflecting element dipping in said non-conductive liquid and being in electrical contact with said conductive member when said driving member is stationary, means for connecting said driving member to said rotating body to rotate said deflecting element through said resilient means and cause a reactive thrust to be exerted upon said deflecting element by said liquid to move said deflecting element axially along said driving member away from said conductive member, and means for electrically connecting said conductive member and said deflecting element to opposite sides of an electrical circuit.

2. An electric switch responsive to the rotary speed of a rotating body which comprises, a container constructed of insulating material, an electrically conductive plate carried in the bottom of the container, a pool of electrically non-conductive liquid carried in the container in contact with and above the conductive member, a rotatable driving sleeve disposed transversely to said electrically conductive plate, a propeller type electrically conductive deflecting element axially movable upon said driving sleeve, resilient means connecting said sleeve and said deflecting element for rotating said deflecting element with said sleeve, said deflecting element dipping in said non-conductive liquid and being in electrical contact with said conductive plate when said driving sleeve is stationary, means for connecting said driving sleeve to said rotating body to rotate said deflecting element and cause a reactive thrust to be exerted upon said deflecting element by said liquid to move said deflecting element axially along said driving sleeve away from said conductive member, and means for electrically connecting said conductive member and said deflecting element to opposite sides of an electrical circuit.

3. An electric switch responsive to the rotary speed of a rotating body which comprises, a container, a metal plate carried in the container, a pool of electrically non-conductive liquid carried in the container in contact with and above the metal plate, a rotatable driving sleeve disposed transversely to said metal plate, an electrically conductive deflecting element having radially extending blades, said deflecting element being axially and rotatably movable upon said driving sleeve, a coil spring connecting said driving sleeve and said deflecting element, the blades of said deflecting element being urged into said non-conductive liquid and into electrical contact with said metal plate by said coil spring when said driving sleeve is stationary, means for connecting said driving sleeve to said rotating body to rotate said deflecting member through said coil spring connection and cause a reactive thrust to be exerted upon said blades by said liquid to move said deflecting element axially along said driving sleeve and said blades away from said metal plate, and means for electrically connecting said metal plate and said deflecting element to opposite sides of an electrical circuit.

4. An electric switch responsive to the rotary speed of a rotating body which comprises, a container, an electrically conductive member carried in the container, a pool of electrically non-conductive liquid carried in the container in contact with and above the conductive member, a rotatable driving member disposed transversely to said electrically conductive member, an electrically conductive deflecting element freely mounted upon said driving member for axial and rotatable movement thereon, a helical spring anchored at one end upon said driving member and circumscribing said driving member, the opposite end of said spring being anchored upon said deflecting element whereby said element is resiliently movable axially and rotatably upon said driving member, said deflecting element being urged by said spring into electrical contact with said conductive member when said driving member is stationary, means for connecting said driving member to said rotating body to rotate said deflecting element and cause a reactive thrust to be exerted thereon against said spring by said liquid to move said deflecting element away from said conductive member, and means for electrically connecting said conductive member and said deflecting element to opposite sides of an electrical circuit.

References Cited in the file of this patent

UNITED STATES PATENTS

| Number | Name | Date |
|---|---|---|
| 45,522 | Rich | Dec. 20, 1864 |
| 2,109,732 | Nielsen | Mar. 1, 1938 |
| 2,518,478 | Kohl | Apr. 15, 1950 |
| 2,584,983 | Butterworth | Feb. 12, 1952 |